Inventor
James L. Wilkerson

Patented May 29, 1951

2,554,764

UNITED STATES PATENT OFFICE 2,554,764

DEVICE FOR INDICATING EXCESSIVE WEAR OR HEAT TO PREDETERMINED ELEMENTS OF VEHICLES

James L. Wilkerson, Phoenix, Ariz.

Application September 5, 1947, Serial No. 772,250

6 Claims. (Cl. 116—114)

This invention relates to new and useful improvements in indicating devices and more particularly to a device for indicating excessive heat or wear to the tires, brakes, and the like of vehicles, trucks or trailers.

The primary object of the present invention is to provide a device of the character disclosed that is quickly and readily applied to trucks and the like in order to indicate to the driver that elements of the truck are being excessively worn or heated.

Another important object of the present invention is to provide a device that is quite simple and practical in construction.

A still further aim of the present invention is to provide an indicating device for vehicles that is strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
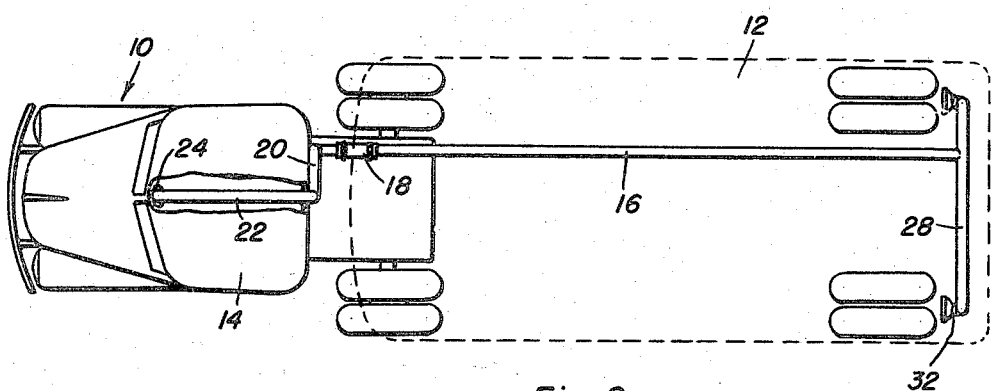
Figure 1 is a top plan view of a truck coupled to a trailer and showing the present invention applied thereto.

Referring now to the drawings in detail, wherein, for the purpose of illustration, there is disclosed the preferred embodiment of the present invention, the numeral 10 represents a truck which is pivotally connected in a usual manner to the forward portion of a trailer 12. This truck is provided with a cab 14 wherein the driver is usually seated. The present invention does not attempt to claim the above conventional structure, but is merely an attachment therefor that will indicate excessive wear to predetermined parts of the truck or trailer.

The numeral 16 represents a longitudinal main conduit which is removably secured by suitable means against the lower face of the trailer frame 18. Coupled to the forward end of the conduit 16 by use of a flexible tubing 18 is one end of a further substantially L-shaped conduit 20, the lower leg of which bears against the rear portion of the cab 14. The upper end of this conduit 20 is connected to one end of a forward, substantially L-shaped conduit 22 which bears upon the upper portion of the cab 14. The forward terminal portion of the conduit 22 is bent inwardly to extend through a retaining flange 24 surrounding an aperture provided in the upper portion of the cab, and this inturned end is flared, as at 26, to communicate with the interior of the cab.

Communicating with the rear terminal of the conduit 16 is the central portion of a transverse conduit 28 having its ends turned downwardly to provide vertical extensions 30. The lower ends of these extensions 30 are flared, as at 32, to oppose the rear wheels 34 of the trailer.

Figure 2:
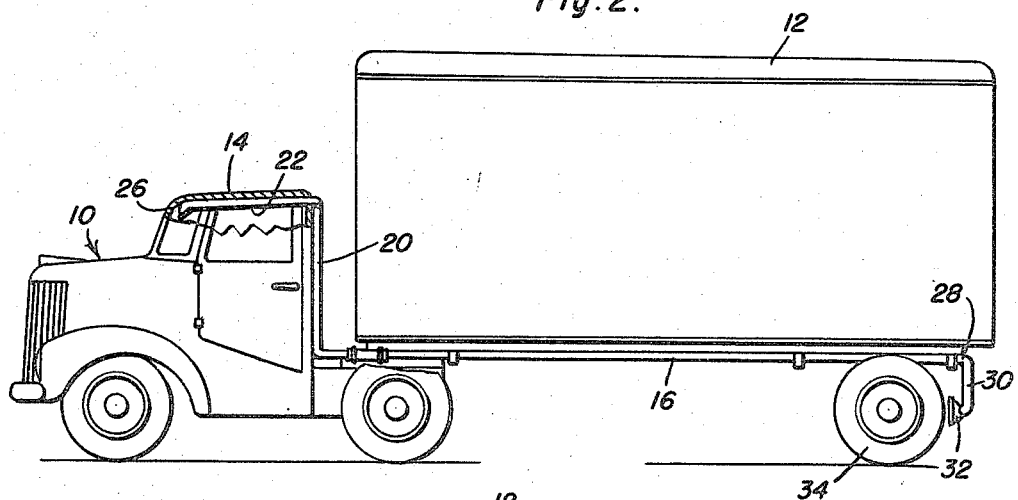
Figure 2 is a side elevational view of Figure 1, showing the manner in which the device is applied to the interior of the truck in slightly modified form, and with parts of the truck broken away and shown in section.
Figure 3:
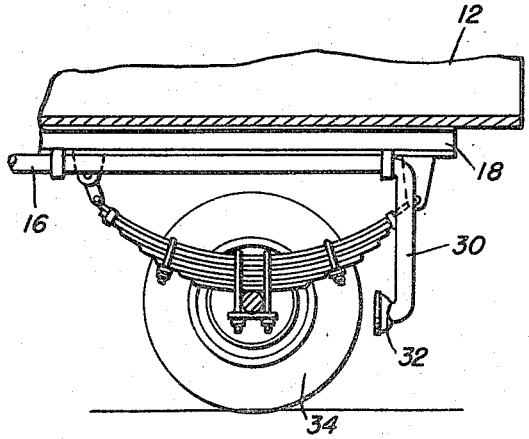
Figure 3 is an enlarged fragmentary side elevational view of Figure 1, and with parts of the truck and main conduits broken away and shown in section.

It should be noted that the conduit 22 may also extend through the rear portion of the cab 14 and be suitably mounted upon the inner face of the upper portion of the cab, as shown in Figure 2, without diverting from the scope of the present invention.

In practical use of the device, when the vehicle is in motion and the rear wheels 34 of the trailer or brake become overheated, the odor of the wearing elements will be transmitted through the flared ends 32, ends 30, conduits 28, 16, 20 and 22, and hence through flared end 26 into the interior of the cab, to indicate to the driver that the trailer tires or brakes need attention.

Obviously, this device with slight modifications may also be applied to trucks without trailers or to passenger vehicles to function in a manner as previously described.

It should be noted that this device will transfer or conduct fumes, smoke and the like from a "hot" tire, "hot" wheel bearing, "hot" brakes or other heated elements of a vehicle to the cab of the vehicle, so that the driver seated in the cab may smell the smoke or fumes and stop the vehicle to remedy or prevent the heating. The device applies to the front wheels or members of the vehicle as well as to the rear thereof. The funnels on the rear of the trailer are so placed that they will pick up a portion of the fumes and smoke from any of the tires, wheels or brakes and transfer these fumes and smoke to the cab of the vehicle. In order to illustrate the above, when a wheel bearing becomes dry from lack of grease, it will give off fumes and smoke which can be detected readily by the odor. This applies as well to brakes adjusted too tight or dragging, and to tires, either front or rear, which become heated from friction caused by rubbing the body or frame of the vehicle, or by running with low air pressure causing excess flexing of the tire. The purpose of the funnels on the rear end of the tube facing forward is to gather fumes and smoke, and the forward motion of the vehicle forces these fumes through the tube into the cab. The forward end of the tube in the cab must point to the rear of the vehicle so that the forward motion of the vehicle will not create a pressure on the forward end of the tube.

Having described the invention, what is claimed as new is:

1. In combination with a vehicle having a cab and also having a trailer including rear wheels with tires thereon of a device for conducting fumes of burning rubber from the rear tires to the vehicle cab, said device comprising a first conduit mounted on the vehicle and having an end received in the vehicle cab, a further conduit mounted on the trailer and coupled to said first conduit, said further conduit including a depending rear end portion located adjacent to and rearwardly of the rear wheels, and a funnel member on said depending rear end portion and facing said rear wheels.

2. In a vehicle including wheels having tires thereon and a cab, a conduit mounted on the vehicle and having a forward end portion received in the cab and a depending rear end portion, and a funnel member on the depending rear end portion and located relatively close to a selected wheel of the vehicle for receiving fumes resulting from excessive heat of the tire on said selected wheel.

3. In combination with a vehicle having a trailer including rear wheels; means effective on the sense of smell for indicating a condition which may result in wear of the rear wheels of the trailer comprising a first conduit mounted on the vehicle, a further conduit communicating at one end with said first conduit, said further conduit communicating with the interior of the vehicle, and fume conducting means carried by the opposite end of said first conduit positioned adjacent and rearwardly of the rear wheels of the trailer.

4. The combination of claim 3 wherein said last-mentioned means includes an elongated horizontally disposed cross conduit communicating intermediate its ends with said first conduit, said cross conduit including downwardly extending end portions disposed adjacent to and rearwardly of the rear wheels of the trailer.

5. The combination of claim 4 wherein said downwardly extending end portions include outwardly flared extremities extending toward the rear wheels of the trailer.

6. In a a vehicle including a truck having a cab and a trailer having a bed and rear wheels, means effective on the sense of smell for indicating a condition which may result in wear to the rear wheels of the trailer comprising a longitudinal first conduit mounted upon the trailer bed, a further conduit mounted on the truck and communicating with said first conduit, said further conduit including a forward end entering the interior of the cab, an elongated transverse conduit mounted on the trailer bed communicating intermediate its ends with the first conduit and having downwardly extending end portions, and a flared member carried by and projecting laterally from each of said downwardly extending end portions of said transverse conduit and disposed adjacent the rear wheels of the trailer.

JAMES L. WILKERSON.

REFERENCES CITED

The following references are of record in the file of this patent:

UNITED STATES PATENTS

| Number | Name | Date |
| --- | --- | --- |
| 1,154,128 | Rich | Sept. 21, 1915 |
| 1,296,499 | Fether | Mar. 4, 1919 |
| 1,755,834 | Marr et al. | Apr. 22, 1930 |
| 1,923,349 | Wolverton | Aug. 22, 1933 |
| 2,361,924 | Boynton | Nov. 7, 1944 |

FOREIGN PATENTS

| Number | Country | Date |
| --- | --- | --- |
| 442,112 | Germany | Mar. 23, 1927 |